J. M. WHITE.
AUTOMOBILE SIGNAL.
APPLICATION FILED MAR. 20, 1918.

1,313,770.

Patented Aug. 19, 1919.
3 SHEETS—SHEET 1.

INVENTOR
Jerry Monroe White

WITNESSES

BY
ATTORNEY

J. M. WHITE.
AUTOMOBILE SIGNAL.
APPLICATION FILED MAR. 20, 1918.

1,313,770.

Patented Aug. 19, 1919.
3 SHEETS—SHEET 2.

INVENTOR
Jerry Monroe White

WITNESSES

BY

ATTORNEY

J. M. WHITE.
AUTOMOBILE SIGNAL.
APPLICATION FILED MAR. 20, 1918.
1,313,770.
Patented Aug. 19, 1919.
3 SHEETS—SHEET 3.
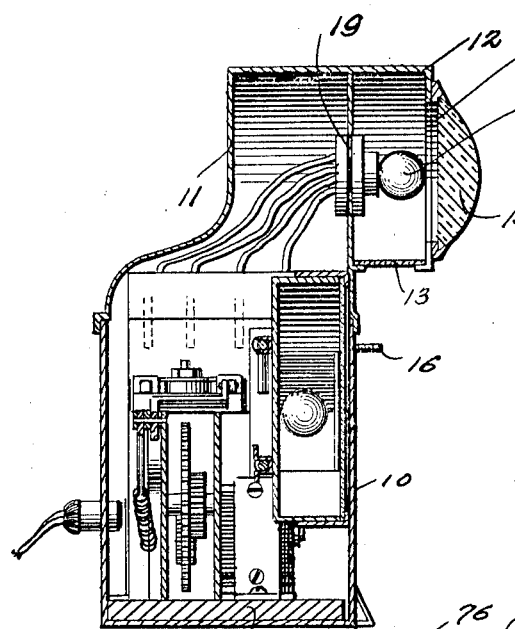
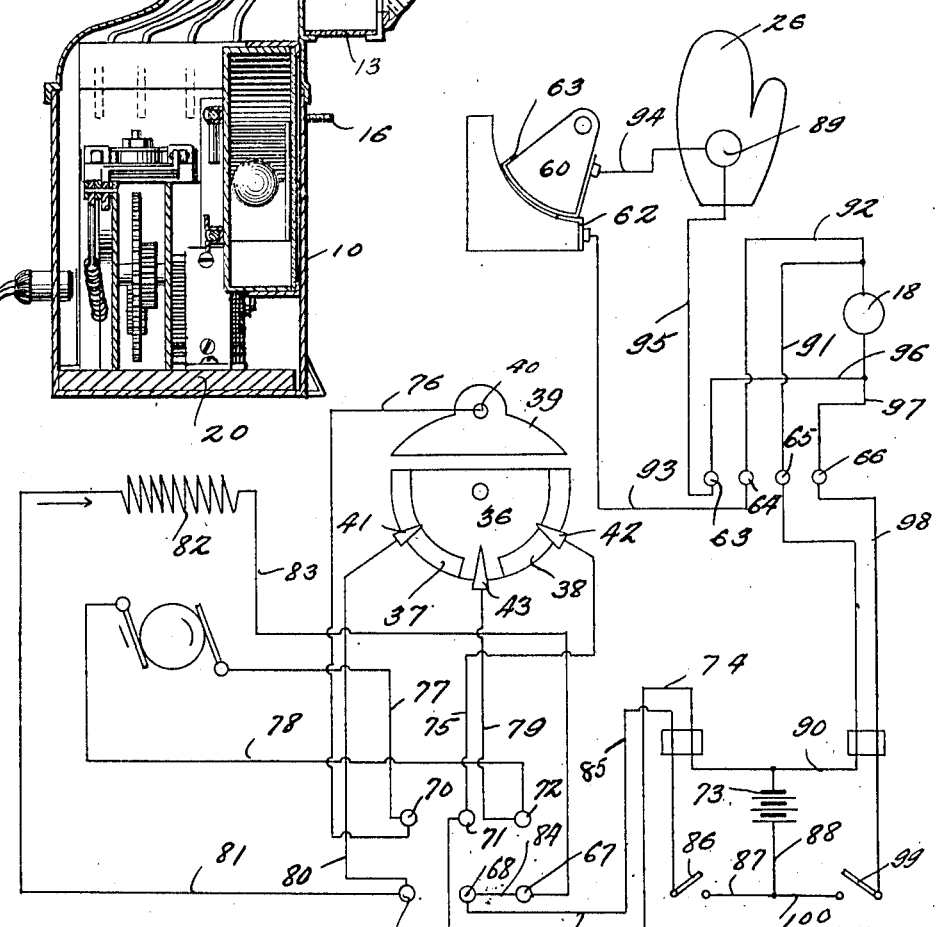
INVENTOR
Jerry Monroe White
BY
ATTORNEY
WITNESSES

UNITED STATES PATENT OFFICE.

JERRY MONROE WHITE, OF BOSTON, MASSACHUSETTS.

AUTOMOBILE-SIGNAL.

1,313,770.   Specification of Letters Patent.   Patented Aug. 19, 1919.

Application filed March 20, 1918. Serial No. 223,613.

*To all whom it may concern:*

Be it known that I, JERRY MONROE WHITE, a citizen of the United States, residing at Boston, in the county of Suffolk and State of Massachusetts, have invented certain new and useful Improvements in Automobile-Signals, of which the following is a specification.

This invention has relation to traffic signals for motor vehicles and has for an object to provide a signaling device adapted to be placed upon the rear of a motor vehicle to indicate to the occupants of following vehicles when the vehicle carrying the signal is about to make a stop or to slow down in speed.

Another object of the invention is to provide a signaling device of the character above described embodied in a casing together with the usual tail light with means for supporting the license tag whereby the tag may be illuminated at all times, the tail light illuminated at night and the signal actuated at the will of the driver.

Another object of the invention is to provide a signaling device for motor vehicles having the above named characteristics including a signaling device formed in the shape of the human hand and designed for movement in a horizontal plane to a position beyond a shield designed to normally cover the same whereby the hand may be exposed to signal the occupants of following vehicles, said signaling device carrying an illuminating means whereby the signal may be visible at night.

A still further object of the invention is to provide a signaling device for motor vehicles, embodying a signal of the character above set forth movable in a horizontal plane, and embodying an electric motor and gearing operable to move the signal in a manner stated, and a reversing mechanism whereby the direction of travel of current through the motor may be reversed to cause the signal to travel in one direction or the other at the will of the driver.

In addition to the foregoing my invention comprehends improvements in the details of construction and arrangement of the correlative parts to be hereinafter more fully described and particularly set forth in the appended claim.

In the accompanying drawings in which similar and corresponding parts are designated by the same characters of reference throughout the several views in which they appear:—

Fig. 7, is a vertical section taken on the line 7—7 of Fig. 3, and

Fig. 8, is a diagrammatic view illustrating the method in which the signal is electrically connected.

Figure 1:
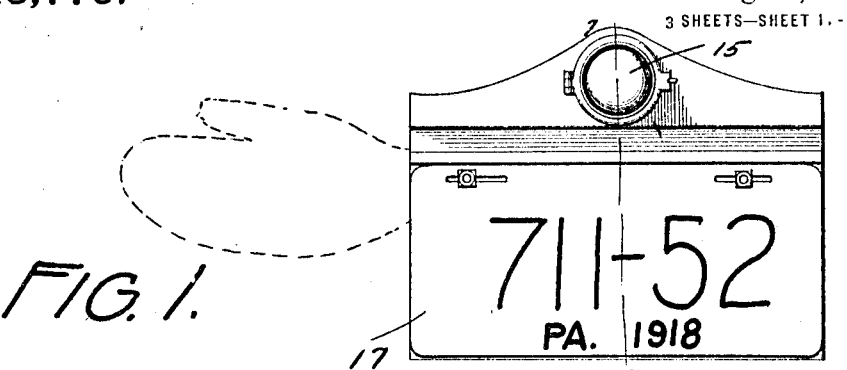
Figure 1, is a view in front elevation of a signaling device constructed in accordance with my invention.
Figure 2:
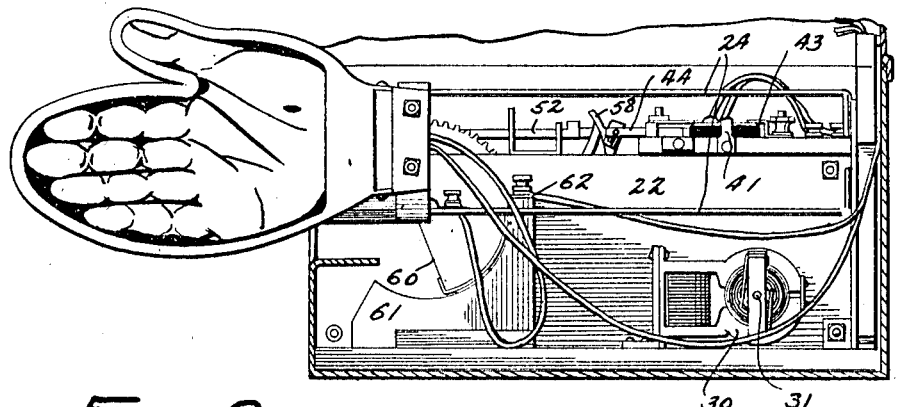
Fig. 2, is a view of the device in longitudinal section viewing the apparatus from the front.

With reference to the drawings 10 indicates a rectangular casing open at its upper end upon which the cap 11 is seated forming a closure for the casing. The cap 11 is formed with an extension 12 overhanging the front of the casing said extension being of rectangular configuration and extending from end to end of the casing, and having its under side normally closed by means of a plate of glass 13 or other transparent material and also having a circular opening 14 in its front face closed by a lens 15 preferably of red glass. Bolts 16 project from the front face of the casing 10 upon which the license tag 17 may be supported. An incandescent lamp 18 is mounted within the extension 10 behind the lens 18 whereby when said lamp is illuminated its rays may also pass through the transparent material 13 to illuminate the license tag as well. The lamp 18 is mounted in a suitable socket 19 supported within the cap 11.

Located within the casing 10 at the bottom thereof is a plate 20 normally disposed in a horizontal plane, and extending upwardly from one end of said plate 20 is a second plate 21. Mounted upon the base plate 20 is a frame-work consisting of a pair of horizontally spaced plates 22, and connecting the upper edges of said plates 22 at one end adjacent the plate 21 is a plate 23 of insulating material. A pair of horizontal, parallel, vertically spaced rods 24 are provided having adjacent ends secured to the plate 23 and opposite ends supported in the bracket 25 adjacent the opposite end of the apparatus. A signaling element 26 is provided in the nature of a casing formed into the shape of the human hand and having secured to its rear face a pair of parallel guides 27 and 28 designed to receive the rods 24 whereby the signaling element may be mounted for movement in a horizontal plane. The guide 28 is formed with a rack bar 29 for a purpose which will be presently noted. A motor 30 of conventional type is mounted upon the base plate and the armature shaft 31 extends through and is journaled in the plates 22 of the frame. The shaft 31 is connected by means of a train of gears indicated collectively at 32 to a shaft 33 located above the frame plate 22 at a point opposite the end occupied by the motor and between the guide members 27 and 28 of the signaling element. The shaft 33 is provided with a pinion 34 which meshes with the rack bar 29, so that when the motor is energized, its motion is transmitted through the shaft 31, gear train 32, shaft 33 and pinion 34 to the rack bar 29, thereby moving the signaling element in one direction or the other depending upon the direction of rotation of the motor shaft. In the train of gears 32, is a shaft 35 which extends beyond the rear plate 22 for a purpose which will be presently noted.

Figure 3:
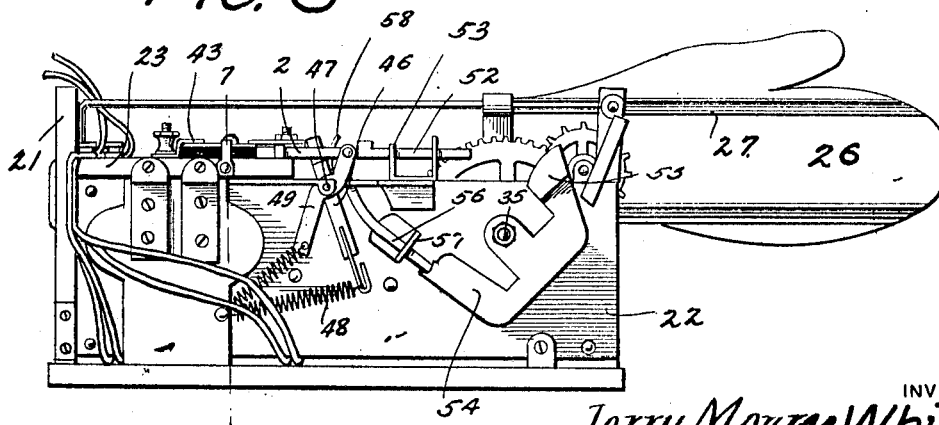
Fig. 3, is a view of the mechanism for actuating the signal in rear elevation.
Figure 4:
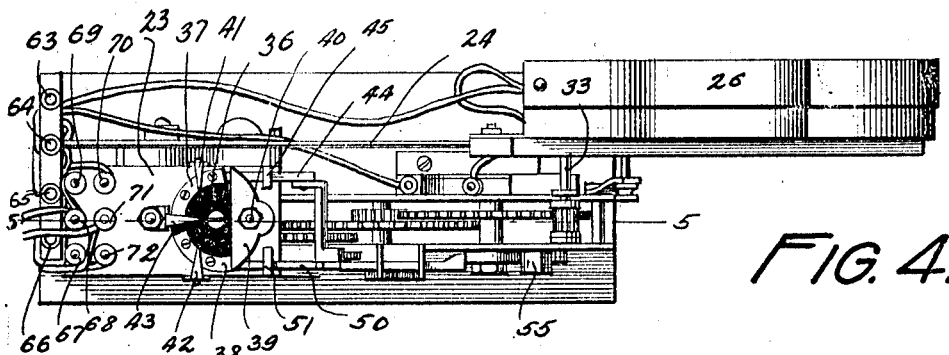
Fig. 4, is a view of the signal actuating mechanism in top plan.
Figure 5:
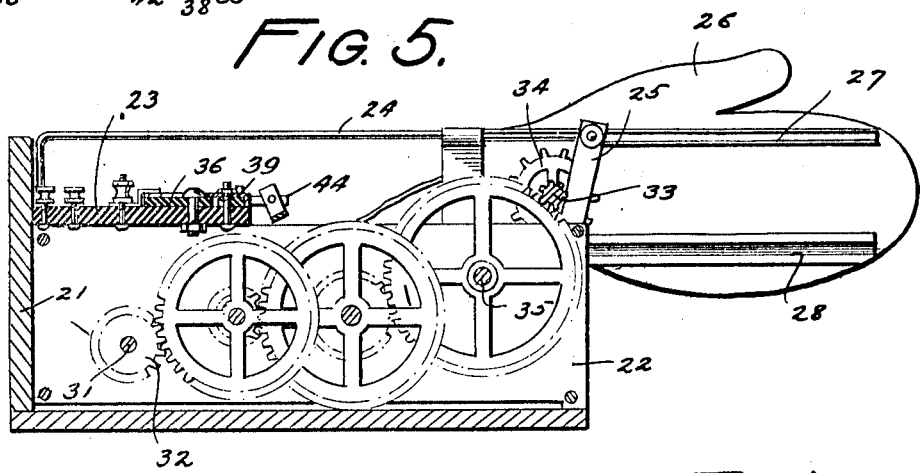
Fig. 5, is a longitudinal section taken on the line 5—5 of Fig. 4.
Figure 6:
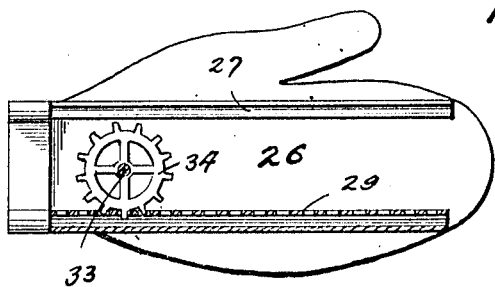
Fig. 6, is a detail view in rear elevation of the signal itself.

Mounted upon the upper surface of the insulated plate 23 is a current reversing mechanism consisting of a semi-circular segment 36 of insulated material provided at its periphery with a pair of arcuate segments 37 and 38 spaced apart at their adjacent ends. Located adjacent the diametrical edge of the semi-circular disk 36 is a contact strip 39 adapted to extend from one edge of the semi-circular member to the other and mounted upon an upstanding bolt 40. Normally contacting with the segments 37 and 38 are contact fingers 41 and 42 respectively as indicated. Located in the space between the adjacent spaced ends of said segments 37 and 38 is a third contact finger 43 normally engaging the insulated portion of the semi-circular element but adapted to contact with either of said segments 37 or 38 during movement of the semi-circular member in a manner to be presently noted. Contacting with the diametrical edge of the semi-circular element at one end thereof is a longitudinally movable push bar 44 mounted for movement in a guide or bracket 45. A lever 46 is fulcrumed for movement in a vertical plane around a horizontal pin 47, said lever being normally disposed in a vertical position with its upper end extended across the top of said frame and pivotally connected to the bar 44. A coil spring 48 connects the lower end of said lever 46 with a stationary point of the frame to normally retract said bar 44. Also mounted upon the horizontal pin 47 is a lever 49 disposed in a vertical plane and having its upper end pivotally connected to a longitudinally movable push bar 50 guided in the bracket 51 and adapted to contact the diametrical edge of the semi-circular disk 36 at a point opposite the point of contact of the push bar 44. The lower end of the lever 49 is similarly provided with a coil spring to hold the push bar 50 in a retracted position. A longitudinally movable slide bar 52 is disposed in horizontal alinement with the push bar 50 and mounted for longitudinal movement in brackets 53 as indicated in Fig. 3 of the drawings. Mounted upon the shaft 35 is a hammer having a pair of oppositely extending arms 54 and 55, the latter adapted for contact with one end of the slide bar 52 so as to move the same longitudinally. Mounted upon the rear face of the rear plate 22 is a downwardly inclined slide bar 56 guided in brackets 57 and designed for engagement at its lower end by the arm 54 mentioned above. The opposite end of the slide bar 56 extends and is designed to engage a cam member 58 mounted upon the upper end of the lever 46. Mounted upon the shaft 35 at its end opposite that carrying the arms 54 and 55 is a sector 60 movable in a concaved guide member 61 having a metallic contact 62 in one end. A contact strip is mounted on the periphery of the sector 60 for engagement with the member 62 in one position. The upper edge of the plate 21 is formed with four binding posts indicated at 63, 64, 65 and 66. Mounted upon the plate 23 are also six binding posts indicated at 67, 68, 69, 70, 71 and 72. The apparatus may be operated by means of a few cells or by the magneto of the motor vehicle, the source of current being indicated in the diagrammatic view at 73. One pole of the source of current is connected by means of a conductor 74 to the binding post 71 and said binding post is then connected by means of a lead 75 to the contact 42 of the motor reversing mechanism. The contact plate 39 of the motor reversing mechanism is connected by means of a conductor 76 to the binding post 70 and said binding posts are connected by means of a lead 77 to one brush of the motor which bears against the commutator. The other brush is then connected by means of a conductor 78 to the binding post 72, said binding post being in turn connected by means of the lead 79 to the contact 43 of the reversing mechanism. The contact 41 of said reversing mechanism is then connected by means of a conductor 80 to the binding post 69 and said binding post connected by means of a conductor 81 to the field magnet 82 of the motor at one terminal thereof, the other terminal being connected by means of the conductor 83 to the binding post 67 which binding post is connected by means of the conductor 84 to the binding post 68, the latter being connected by means of the lead 85 to a switch 86 located adjacent the driver and which is adapted to connect the circuit through the conductors 87 and 88 to the source of current returning to the other pole. The lighting circuit includes the incandescent lamp 18 mentioned above and also an incandescent light 89 mounted in the signal element 26. The source of current 73 is connected at one pole by means of the lead 90 to the binding post 65, the same being in turn connected by means of the lead 91 to one terminal of the incandescent lamp 18, the same terminal being connected by means of the lead 92 to the binding post 64. Said binding post 64 is then connected by means of the conductor 93 to the contact 62 associated with the sector 60 mentioned above. The contact plate of the sector is then connected by means of the conductor 94 to the incandescent lamp 89 of the signaling device at one terminal thereof, the other terminal being connected by means of a lead 95 to the binding post 63. Said binding post is then connected by means of a conductor 96 to the other terminal of the incandescent lamp, which terminal is also connected by means of a conductor 97 to the binding post 66 the latter being in turn connected by means of a conductor 98 to a switch 99 located adjacent the driver's seat and adapted to complete the circuit through a conductor 100 connected to the above mentioned conductor 88.

At night, the switch 99 is moved to closed position so as to illuminate continuously the incandescent lamp 18 serving the purpose of a tail light and also to illuminate the license tag. When it is desired to actuate the signal so as to indicate to occupants of following vehicles the fact that the vehicle in question is about to either slow up or make a complete stop, the switch 86 is moved to closed position whereby the current travels from the source of current 73 through the conductor 74, binding post 71, and conductor 75 to the contact point 42. As the segment 38 of the motor reversing mechanism will stand normally in contact with the contact 43, the current will pass through the segment 38 and into the point 43, leaving said point through the conductor 79 through the conductor 78, through the armature of the motor, returning through the conductor 77 binding post 70 and conductor 76 to the contact plate 39. When the segment 38 is in contact with the point 43 as stated above, the contact plate 39 will obviously be in contact with the segment 37, so that the current will pass to said segment 37 leaving at the contact finger 41 and after passing through the conductor 80 and binding post 69 will enter the conductor 81 and traverse the field magnet 82 of the motor, leaving said field magnet through the conductor 83 and after passing through the binding post 67, conductor 84, binding post 68, will return through the conductor 85 to the switch 86 and the source of current through the conductors 87 and 88. The motor will then be energized and the motion of the armature shaft 31 will be transmitted through the train of gearing 32 to the shaft 33, and pinion 34 thereby moving the signaling element 26 outward from behind the license tag which serves as a shield, as shown in dotted lines in Fig. 1. During this operation of the mechanism, the shaft 35 will be rotated and the arm 54 carried thereby will be brought into engagement with the bar 56 so as to move the same upwardly, the upper end thereof contacting with the cam member 58 so as to cause the lever 46 to engage at its upper end the bar 44 which in turn will engage the semi-circular member 36 of the motor reversing mechanism to shift the same and cause engagement between the contact plate 39 and segment 38 and between the segment 37 and contact finger 43. Current will now leave the source of current 73 and a circuit may be traced as follows: through the conductor 74, binding post 71 and conductor 75 to the contact finger 42. The current will enter the plate 39 and traverse and leave the same, passing through the conductor 76, passing through the binding post 70, conductor 76, entering the armature and leaving the same through the conductor 78, binding post 72, conductor 79 into the contact finger 43. Current will leave the finger 43 and enter the segment 37 contacting therewith, leaving the segment through the contact finger 41 and entering the conductor 80. The current passes through the binding post 69 and enters the conductor 81 passing through the field magnet 82 leaving the same and passing through the conductor 84 passing through the binding post 67, conductor 83, binding post 68, leaving the same and passing through the conductor 85, finally traversing the switch 86, conductor 87 and 88 returning to the source of current. The current thus having been reversed through the armature, in its return the arm 55 contacts with the bar 52 so that the segment is reset in its original and normal position automatically, ready for subsequent operation in the same manner.

Thus it will be clear that the operator by one momentary impulse may cause the signal to be retracted; or the operator by holding the switch 86 closed can cause the projection and immediate retraction of the signal, though in either instance it resumes its former place and normal position. When the signaling element is in outward position the sector 60 will be in a position to contact the member 62 whereupon current will be supplied from the source of current 73 and will pass in a manner obvious in the diagrammatic view through the incandescent lamp 89 thereby illuminating the interior of the signaling element, which will be provided with a facing of transparent material thereby rendering the signaling element visible at night time. When the signaling element is in an inward position obviously the sector will be in a position to break contact with the member 62 whereby the passage of current through the lamp 89 will be discontinued.

While I have illustrated and described my invention with some degree of particularity, I realize that in practice various alterations thereover may be made, and I therefore desire to reserve the right and privilege of changing the form of the details of construction or otherwise altering the arrangement of the correlative parts without departing from the spirit of the invention or the scope of the appended claim.

Having thus described my invention what I claim as new and desire to secure by Letters Patent is:—

In an automobile signal, the combination with a casing, parallel horizontal rods carried thereby, the signal proper, guides thereon movably mounted on said rods, one of said guides having a rack bar, and a pinion engaging said rack bar, of driving mechanism connected by a train of gearing to said pinion, means for reversing the direction of action of said pinion, push bars for actuating said reversing means, slide bars in line with the push bars, and a hammer on the shaft of one of said train of gears having arms for actuating said slide bars according as the hammer is turned, for the purpose set forth.

In testimony whereof I affix my signature in presence of two witnesses.

JERRY MONROE WHITE.

Witnesses:
　CECIL A. McPHERSON,
　IVANHOE A. HENRY.